J. P. EDWARDS & A. J. ROGERS.
Rolls for Reducing Old Rails.
No. 6,433. Reissued May 18, 1875.
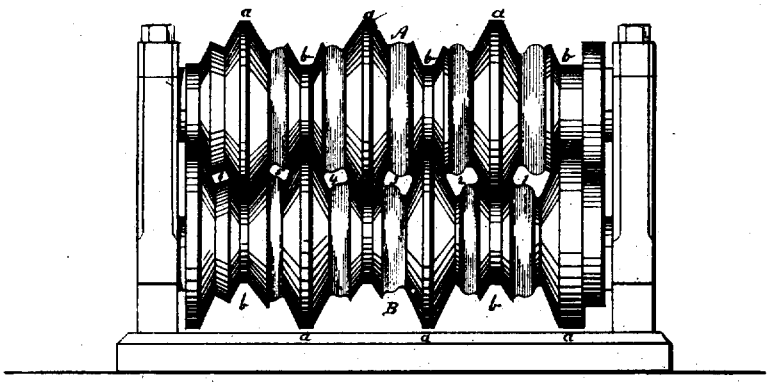
Witnesses
Walt Miller
Mels W. Leggett
Inventors
John P. Edwards,
Andrew J. Rogers.
By Leggett & Leggett
Attorneys
THE NORRIS PETERS CO., PHOTO-LITHO., WASHINGTON, D. C.

UNITED STATES PATENT OFFICE.

JOHN P. EDWARDS, OF CLEVELAND, OHIO, AND AMBLER J. ROGERS, OF JACKSON, MICHIGAN.

IMPROVEMENT IN ROLLS FOR REDUCING OLD RAILS.

Specification forming part of Letters Patent No. 154,789, dated September 8, 1874; reissue No. 6,433, dated May 18, 1875; application filed March 5, 1875.

*To all whom it may concern:*

Be it known that we, JOHN P. EDWARDS, of Cleveland, county of Cuyahoga, State of Ohio, and AMBLER J. ROGERS, of Jackson, county of Jackson, State of Michigan, have invented an Improvement in Rolls for Reducing Railway-Rails, of which the following is a description and specification:

The invention relates to improvements in the rolls, and more particularly to the positions of the grooves in the said rolls, and is designed for reducing old rails or fag-ends into bars; it is also applicable to drawing out railroad-rails, whether of steel or iron, into bars of similar sectional area, but either the same or a different shape.

The invention consists in making the grooves whereby the rail is drawn through between the rolls angular with the axes of the said rolls—that is, so that a line across the bottom of the flange at right angle to the length of the rail would form an angle with the axes of the said rolls; also, in peculiarly-constructed rolls.

The object of the invention is to enable the operator to introduce a railroad-rail or butt-end between the said rolls, and simultaneously to reduce it in depth at the same time with its being drawn out; and while it is being reduced in depth it may be reduced about the flange and web, so that the product will be a rail of similar form, but of less sectional area; or while simultaneously drawing out the rail and reducing its depth to gradually alter its other dimensions, and produce a bar of any desired form or sectional shape, the said reducing-grooves being of such form as to effect the change without lapping or crimping the external surface of the rail, thus producing a product that shall possess the same external surface that was possessed by the rail or butt-end before it was introduced between the rolls.

In the drawings is represented a set of rolls which indicate our invention.

It is well known that steel cannot be welded readily to steel, but that a bar that is formed from faggots of steel will present, when drawn out, seams wherever the said steel surfaces come in contact originally, and the product be thereby greatly impaired. So, also, in rolling out steel rails or butt-ends, the same effect is produced by lapping or crimping the external surface upon itself in the process of rolling.

Heretofore, in reducing steel rails between rolls, the grooves have been made in such a shape that the rail would stand erect when entering the rolls, or would lie flat, so that a line across the bottom of its flange would stand erect. When the rail is introduced between rolls that will admit the rail erect the grooves necessarily have to be sufficiently wide to admit the breadth of the flange and the breadth of the tread. This renders it impossible to support the web of the rail, and prevent it from crimping or lapping upon itself when pressure is brought upon the top of the tread and bottom of the flange. So, also, when the rail is introduced between the rolls in a flat position, or in such a manner that a line across the bottom of its flange is vertical, in that case it is impossible to reduce the depth of the rail—that is, the distance between the tread and the bottom of the flange—because the end surfaces of the grooves come out at right angle to the outer surfaces of the rolls, and therefore do not form a funnel-shaped opening, whereby the rail is griped and drawn in in such a manner as to reduce its depth. It is the object of our invention to overcome this difficulty, and we do it by making the said grooves, as above described, angular with the axes of the rolls—that is, so that when the rail is in the said grooves, a line across the bottom of its flange in a direction perpendicular to the length of the rail will form an angle with the axes of the rolls. The rolls also require to be peculiarly constructed with relation to each other. As ordinarily formed, the sectional area of the groove that is made in one roll, when added to the sectional area of the corresponding groove of the other roll, together make the area or orifice or groove through which the metal passes. Not so with our rolls. In our rolls annular projections *a* on one roll mesh into corresponding annular recesses *b* of the other roll.

It will be seen that the sides of these annular projections form the sides of the grooves themselves, and the result consequent upon the meshing of the said annular projections into their corresponding recesses in the other roll is that the groove or orifice through which the metal is passed is much less than the same sectional areas of the grooves in the two rolls; in other words, the mouth or throat into which the metal is inserted opens out in all directions in funnel shape. The effect is that a bar, every one of whose dimensions are greater than the corresponding dimensions of the groove, will be griped both laterally and vertically by this funnel-shaped mouth, and be drawn into and through the rolls, which may be caused to labor on the whole external surface of the metal, and thereby simultaneously reduce it in all its sectional dimensions—that is, the two rolls will open out in such a manner that a rail, as it is being admitted, will first enter the open mouth of the funnel, its flange striking upon one roll, and its tread upon the other roll, and as it is drawn in by the rolls it will be compressed or diminished in depth.

The effect of passing the rail or butt-end, &c., through the groove 1 is to reduce it simultaneously in all its sectional dimensions, and produce a rail of the same form, but of still less sectional area.

In the drawing, 1 is, say, the first groove, through which the rail or butt-end is passed. The grooves are formed so as to conform to the sides or web of the rail, so that, as the rail is diminished in depth; or, in other words, compressed between the flange and the tread, the curved portions of the grooves will bind in closely, and will prevent the iron from buckling along the web, or, in other words, prevent it from lapping or crimping upon itself.

If the said sides or curved portions of the grooves are made at the same time to reduce or draw out the web, the result will be that the extra metal will be crowded out of the rolls, and there will result a rail of the same sectional form, but of diminished sectional area; and thus from an old rail, or from a butt-end, whether the said rail, &c., be of iron or steel, there may be formed immediately a lighter rail, or a rail of the same form, but of a smaller sectional area, which said rail will have the same external surface that was possessed by the rail or butt-end before it entered the roll and therefore will be free from flaws or seams consequent upon turning in crimping or lapping the external surface upon itself in the process of rolling.

If it is desired to reduce the said rail or butt-end to a bar or rod of square, rectangular, or any other desired form, it is effected by suitable grooves, 2, 3, 4, &c., wherein the curved portions, or portions opposite the web, are gradually widened and enlarged in proportion as the depth decreases.

It will be seen that our invention enables us to reduce a rail to a bar or rod of any desired cross-section without crimping or lapping the external surface.

By the rolls provided with grooves, as heretofore construeted, it was not possible to thicken the metal that is being drawn out, or, in other words, reduce it in depth, and give sufficient support to the sides that, in thickening up, the external surface would not be crimped or lapped upon itself.

We do not limit ourselves, in the use of our invention, to any specialty, but desire it to be understood that our invention consists in forming the rolls with grooves set at an angle, substantially as described, with the axes of the rolls, whereby it is possible to simultaneously reduce all the sectional dimensions of a bar, or whereby one may, at pleasure, reduce one dimension and enlarge another, and thus produce a bar of any desired sectional form, while preserving the same external surface intact that was possessed by the material before it entered the rolls.

In order that the horizontal dimensions of the grooves shall open out in a funnel shape it is necessary that the portions *a* of one roll shall project into recesses *b* of the other roll, in the manner substantially as shown.

What we claim is—

Rolls A and B, provided with a series of reducing-grooves, the said grooves formed at an angle with the axes of the rolls, substantially as set forth, whereby a railroad-rail or butt-end, &c., may be simultaneously reduced in depth and thickness, and formed into a bar of different sectional area, and of the same or different form, without lapping or crimping its external surface, for the purpose set forth.

In testimony that we claim the foregoing we hereunto set our hands this 31st day of December, A. D. 1874, at Cleveland, county of Cuyahoga, State of Ohio.

JOHN P. EDWARDS.
AMBLER J. ROGERS.

Witnesses:
WELLS W. LEGGETT,
FRANCIS TOMNEY.